US011898736B2

(12) United States Patent
Spiro

(10) Patent No.: US 11,898,736 B2
(45) Date of Patent: Feb. 13, 2024

(54) VERTICAL ILLUMINATION DEVICE WITH LAMP MODULES HAVING NANO-OPTICAL LENSES CONFIGURED TO UNIFORMLY ILLUMINATE HORIZONTAL AREAS BELOW

(71) Applicant: EXPOSURE ILLUMINATION ARCHITECTS, INC., Scottsdale, AZ (US)

(72) Inventor: Daniel S. Spiro, Scottsdale, AZ (US)

(73) Assignee: EXPOSURE ILLUMINATION ARCHITECTS, INC., Scottsdale, AZ (US)

( * ) Notice: Subject to any disclaimer, the term of this patent is extended or adjusted under 35 U.S.C. 154(b) by 0 days.

(21) Appl. No.: 17/881,249

(22) Filed: Aug. 4, 2022

(65) Prior Publication Data

US 2022/0390097 A1 Dec. 8, 2022

Related U.S. Application Data

(63) Continuation of application No. 17/246,321, filed on Apr. 30, 2021, now Pat. No. 11,448,388.

(60) Provisional application No. 63/018,832, filed on May 1, 2020.

(51) Int. Cl.

| | |
|---|---|
| ***F21S 8/08*** | (2006.01) |
| ***F21V 29/75*** | (2015.01) |
| ***F21V 29/83*** | (2015.01) |
| ***F21V 23/00*** | (2015.01) |
| ***F21V 5/04*** | (2006.01) |
| *F21Y 115/10* | (2016.01) |
| *F21Y 107/40* | (2016.01) |
| *F21W 131/10* | (2006.01) |

(52) U.S. Cl.
CPC .............. *F21V 29/75* (2015.01); *F21S 8/083* (2013.01); *F21V 5/04* (2013.01); *F21V 23/002* (2013.01); *F21V 23/009* (2013.01); *F21V 29/83* (2015.01); *F21W 2131/10* (2013.01); *F21Y 2107/40* (2016.08); *F21Y 2115/10* (2016.08)

(58) Field of Classification Search
CPC .......... F21V 5/004; F21V 5/007; F21V 21/02; F21V 21/116; F21V 29/503; F21S 8/081; F21S 8/083
See application file for complete search history.

(56) References Cited

U.S. PATENT DOCUMENTS

| | | | | |
|---|---|---|---|---|
| 2,641,687 A | | 6/1953 | Akely | |
| 4,254,453 A | * | 3/1981 | Mouyard | G09F 13/22 345/82 |
| 6,154,362 A | * | 11/2000 | Takahashi | G09F 9/33 362/218 |
| 6,402,337 B1 | | 6/2002 | LeVasseur | |

(Continued)

*Primary Examiner* — Ismael Negron
(74) *Attorney, Agent, or Firm* — XSENSUS LLP

(57) ABSTRACT

An illumination device includes a support section, a heatsink coupled above the support section and including a plurality of flat vertical exterior surfaces, a driver housing coupled above the heatsink, a plurality of light source modules coupled to the exterior surfaces of the heatsink, and a plurality of nano-optical lenses coupled to the light source modules to direct light from the light. source modules to sub-fields of illumination disposed horizontally below. The illumination device is mounted above ground and configured for uniformly illuminating the sub-fields of illumination without direct glare.

20 Claims, 8 Drawing Sheets

(56) References Cited

U.S. PATENT DOCUMENTS

| | | | | |
|---|---|---|---|---|
| 6,948,838 | B2 * | 9/2005 | Kunstler | F21S 43/315 362/520 |
| 7,434,964 | B1 * | 10/2008 | Zheng | F21K 9/232 362/240 |
| 7,440,280 | B2 | 10/2008 | Shuy | |
| 7,473,016 | B2 * | 1/2009 | Flaherty | F21S 8/083 362/555 |
| 7,618,163 | B2 * | 11/2009 | Wilcox | F21V 31/04 362/268 |
| 7,628,505 | B2 | 12/2009 | Flaherty | |
| 7,731,383 | B2 * | 6/2010 | Myer | F21S 9/037 362/373 |
| 7,810,968 | B1 * | 10/2010 | Walker | F21V 21/30 362/249.02 |
| 7,976,199 | B2 | 7/2011 | Berns | |
| 8,157,406 | B2 | 4/2012 | Zheng | |
| 8,356,916 | B2 | 1/2013 | Gordin | |
| 8,585,238 | B2 | 11/2013 | Krogman | |
| 8,770,801 | B1 * | 7/2014 | Berns | F21S 8/083 362/310 |
| 9,212,803 | B2 * | 12/2015 | Auyeung | F21V 29/70 |
| 9,470,393 | B2 * | 10/2016 | Hong | G02B 5/0215 |
| 9,976,714 | B2 | 5/2018 | Geisler | |
| 10,431,076 | B2 | 10/2019 | Jung | |
| 2006/0092638 | A1 * | 5/2006 | Harwood | F21V 23/0435 362/431 |
| 2008/0130299 | A1 * | 6/2008 | Dorogi | F21V 29/75 362/373 |
| 2009/0052175 | A1 | 2/2009 | Xu | |
| 2017/0038018 | A1 | 2/2017 | Johnson | |
| 2021/0215308 | A1 | 7/2021 | Caprara | |

* cited by examiner

| Sub Field | Azimuth | Altitude | Distance |
|---|---|---|---|
| F1-5 | 66° | 41° | 4'-3 3/32" |
| F2-5 | 39° | 31° | 5'-5 21/32" |
| F3-5 | 27° | 22° | 7'-0 19/128" |
| F4-5 | 21° | 18° | 8'-7 13/32" |
| F5-5 | 18° | 16° | 10'-0 35/64" |
| F6-5 | 16° | 14° | 11'-2 59/64" |
| F7-5 | 15° | 13° | 12'-2 9/32" |

VERTICAL ILLUMINATION DEVICE WITH LAMP MODULES HAVING NANO-OPTICAL LENSES CONFIGURED TO UNIFORMLY ILLUMINATE HORIZONTAL AREAS BELOW

CROSS-REFERENCE TO RELATED APPLICATION

This application is a Continuation of U.S. patent application Ser. No. 17/246,321, filed Apr. 30, 2021, which claims priority to Provisional Patent Application No. 63/018,832, filed May 1, 2020. The disclosures set forth in the referenced applications are incorporated herein by reference in their entireties.

BACKGROUND

Walkways are commonly illuminated by pole or bollard mounted luminaires. Bollards are employed where low mounting height is desired. Low mounting height prevents present day bollards from uniformly illuminating extended areas beyond. The spacing between bollards is determined by a design criterion configured to assure safe passage for pedestrian walking at night.

Most bollards marketed in North America today primarily rely on dated bollard structures originally configured to operate high-intensity discharge (HID) lamp sources. Today, many of these structures are adapted to operate planar light-emitting diode (LED) light sources. Adapting dated structures to an LED light source compromises the full utility of the LED light source. The HID light source is spherical in shape, while the LED light source is planar. Consequently, the optical assembly of the dated bollard structure adapted to accommodate the current LED planar light source technology falls short in maximizing the spacing between bollards, reducing apparent glare, extending the length of an illuminated pathway and maintaining high degree of lighting uniformity along the pathway.

Further, legacy structural architecture of a traditional bollard makes the installation and maintenance of the bollard needlessly more difficult. Many LED bollards today also fail to effectively control the directionality of their emitted light and manage the LED light source and driver heat dissipation. Finally, the legacy bollard design was not configured to be coupled to IOT devices. Modern market demands an option to operate lightings and/or non-lighting-related devices alone or in unison.

The illumination apparatus of the present disclosure has broad lighting industry applications, the following teaching focuses on bollard luminaire light source optical arrangement, thermal management, and integration with Internet of Things (IOT) devices.

SUMMARY

A form of the light-emitting apparatus of the present disclosure directly corresponds to optimal optical performance that generates long or long and wide uniform fields of illumination having little or no direct glare. This solution creates the best condition for a light source to emit the highest light output toward a preconfigured location within the field of illumination. To achieve this objective the design of the elevated light-emitting apparatus must consider variables, including at least one of:

a. The height of the light source from the surface to be illuminated.

b. The distance each field and sub-field of illumination is from the light source.

c. The angle each field and sub-field of illumination is from the light source.

d. The number of LED lamps required to populate every light module.

e. The power input needed for each lamp in the light source module.

f. The best nano-optical lens needed to generate the most efficient light beam in the desired direction.

g. The orientation of the light source modules' retaining surfaces in relation to the field and sub-field of illumination target.

h. The light reflectance properties of the field of illumination.

The light-emitting apparatus of the present disclosure yields superior performance by preconfiguring the relationship between a stationary vertical light-emitting apparatus set above a horizontal surface at a specific height and at least one horizontal surface area below wherein each light source lamp and light source module light output is configured to illuminate sub areas and sub-fields within a plurality of fields, together forming a contiguous field of illumination that is uniform, longer and/or wider than present day art, consuming minimal energy, and generating little or no direct glare.

The light source modules of the bollard are coupled to a heatsink. A profile of the heatsink, driven by the optical design requirements, includes several flat exterior areas that retain the light source modules. The light source modules coupled to the heatsink employ, in part or in whole, lamps' dedicated optical lenses. Each nano-optical lens directs the lamp's light beam toward its sub-field in the field of illumination, having preconfigured beam spread angle and pattern. The light source modules next to a bollard require less flat surface area and/or input power to illuminate the area below and in the proximity of the bollard, while remote field/s require larger areas and/or input power, as the light needs to travel a longer distance.

A profile of the bollard elements may be configured to emulate the profile of the heatsink giving the assembly a distinct architectural appearance. Extended vertically, the bollard assembly may be configured to become a pole mounted light source. The profile of the assembly may vary based on the illumination task required. For example, an assembly tasked with illuminating an area may have a segmented/multi-faceted circular or square profile, whereas an assembly tasked with illuminating a walkway may be configured to have a truncated diamond shaped profile with its heatsink exterior flat surfaces' light source modules illuminating the walkway only and the remaining flat surfaces may be configured to be coupled to blank modules without a light source.

In addition to the optical innovation, this embodiment may be configured to employ a passive means to cool the heat generating lamp module by dissipating the heat by means of flowing air through the heatsink interior. This innovation may be configured to integrate IOT devices to the bollard, expanding on versatile utility of the bollard.

ELEMENT LIST

Figure 1D:
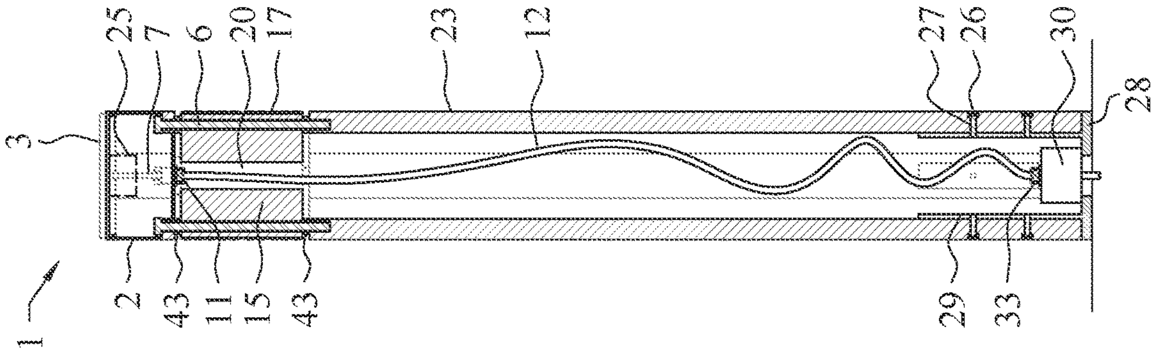
FIGS. 1A-1D show elevations and sections of the bollard embodiment.

1. Bollard
2. Driver housing
3. Driver housing cover
4. Spacer/s ring/s
6. Through bolt
7. Top cover bolt
8. Top cover through bore
9. Top cover bolt threaded bore
10. Driver housing through bolt bore
11. Driver housing power or power and data receptacle
12. Power or power and data conductor cable
13. Heatsink section
14. Heatsink light source retaining flat surface
15. Fins
16. Heatsink through bolt bore
17. Light source module
18. Lens
19. Lamp dedicated nano-optical lens
20. Central channel opening
21. Base support section
22. Base support threaded bore
23. Base support wall
24. IOT device
25. Light source driver
26. Base support securing bolt
27. Base plate channel threaded bore
28. Anchoring plate assembly
29. Guiding channel
30. Junction box
31. Junction box anchoring to plate bore
32. Base plate anchor bolt
33. Junction box cover with receptacle
36. Field of illumination
37. Sub-field of illumination
38. Glare angle
39. Dark sky cut-off angle
40. Human
41. Substrate
42. Light source
43. Air gap
44. Lamp/s
45. Walkway
48. Sub-area of illumination
49. Lamp center beam
50. Lip
51. Light source module screw
52. Light source module bore
53. Anchor bolt nut/s

DETAILED DESCRIPTION

Advances in computerized optical lens design and manufacturing technology today overcome technological limitations of light optics provided by a legacy bollard design. Embodiments of a bollard 1 may use light source 42, the LED, is planar, having a beam pattern spread of approximately 1200 in its natural state. When coupled with a lamp dedicated nano-optical lens 19, the beam may be configured to be reduced to as low as a 1° spread angle with relatively low losses.

In general, the smaller the light source 42, the more efficient it can be. Therefore, an array of lamps 44, which are reduced form LED lamps, coupled to a substrate 41 and having a plurality of lamp dedicated nano-optical lenses 19 over the lamps can be pre-configured as a light source module 17 capable of efficiently and uniformly illuminating sub-fields of illumination 37 near and far.

The bollard of the present disclosure includes a base support section 21, a heatsink section 13, and a driver housing 2. The base support section 21 is coupled below to a ground surface and above to the heatsink 13. The heatsink 13 retains on its exterior heatsink light source retaining flat surfaces 14 a plurality of light source modules 17. The heatsink 13 is coupled to the base support section 21 below and the driver housing 2 above.

The driver housing 2 retains the light source driver 25 and/or other input/output electronic devices. These devices may be configured to include at least one of: a camera, a processor, resident memory, code, back-up power storage, and a transceiver. Through bolts 6 inside the driver housing 2 can mechanically engage the heatsink 13 and the base support section 21 to the driver housing 2. A detachable power conductors' or power and data conductors' cable 12 extend from the inside of the bottom of the base support section 21, through the interior of the heatsink 13 secured to the bottom of the driver housing 2.

The bollard 1 includes an air gap 43 opening between the heatsink 13 and both the driver housing 2 and the base support section 21. In other embodiments, the walls of the heatsink 13, on top or bottom of the heatsink 13, may define the air gap 43 openings. Orientation and positioning of the heatsink light source retaining flat surfaces 14 of the light source modules 17 in relation to the sub-fields of illumination 37 is quintessential for this innovation. The heatsink's 13 profile form driven by optical considerations is novel. This embodiment accentuates the novelty of the heatsink's 13 exterior profile by extending the form to the driver housing 2 above and the base support section 21 below, giving the bollard 1 assembly a new appearance where form follows function.

To attain best performance, the light source modules' 17 orientation and/or orientation and tilt angles are pre-configured in relation to the sub-fields to be illuminated 37. Attaining such performance mandates that the lamp center beam 49 is positioned as close as possible to a right angle in relation to its dedicated nano-optical lens 19. A shallower angle light beam either requires a secondary optics or a good portion of the emitted light is absorbed into the optical lens. Both scenarios are discouraged for efficacy losses. To optimally orient or orient and tilt the bollard's 1 light source modules 17 in relation to their respective sub-fields of illumination 37 requires the light source modules' substrates 41 to be coupled to the heatsink 13 with reciprocating heatsink light source retaining flat surfaces' 14 pre-configured orientation and/or tilt angles, having sufficient surface area to dissipate the module's 17 lamp heat generated. In other words, a profile of the heatsink 13 is configured to optimize illumination capabilities of the bollard 1.

The heatsink 13 may be made of metallic or non-metallic material. The heatsink 13 includes a predefined number of exterior heatsink light source retaining flat surfaces 14, predefined width, height, and tilt angle. Interior of the heatsink 13 is configured to induce cooling airflow having at least one central channel opening 20 extending through the heatsink 13 having bottom and top openings. In the present embodiment, the heatsink employs a passive cooling method of light source heat dissipation as described in U.S. Pat. No. 8,931,608.

In one embodiment, cool air enters an air gap 43 from below the heatsink section 13 rising through at least one central channel opening 20 inside and exiting through an air gap 43 opening on top of the heatsink 13. The air gaps 43 shown above and below the heatsink 13 are formed by spacer rings 4 inserted into through bolts 6 that couple the heatsink 13 to the base support section 21 and the driver housing 2. The spacer rings 4 may be coupled to a screen 5 that allows for air flow while preventing insects and/or debris to enter the bollard's 1 interior. In yet another embodiment, cool air enters from below the heatsink 13 and/or opening/s in the bottom wall/s of the heatsink section 13 rising through at least one central channel opening 20 inside and exiting through opening/s at the top of the heatsink 13 and/or opening/s at the top exterior wall of the heatsink 13. In yet another embodiment, air cooling openings may be deployed.

In one embodiment, moisture may travel through the heatsink section 13 and the base support structure 21 and evacuate from below, with no exposure to the embodiment's electrical components. In another embodiment, the bollard 1 assembly is impervious to moisture penetration despite having air cooling vents.

The driver housing 2 is located at the top of the bollard 1. In this embodiment, an air gap 43 below the driver housing 2 enables the evacuation of hot air generated by the heatsink 13 light source modules 17 below. The driver housing 2 employs a top cover 3 having two top cover screws 7 mechanically securing the driver housing cover 3 to the driver housing 2. The driver housing 2 enclosure retains at least one of a light source driver 25 and/or other input/output electronic devices. Through bolts 6 inside the driver housing 2 may couple the assembly's key elements mechanically joining the heatsink 13 and the base support section 21 to the driver housing 2. A detachable power or power and data conductors' cable 12 extends from the inside a junction box cover receptacle 33 at the bottom of the base support section 21, through the interior of the heatsink 13 secured to the bottom of the driver housing 2. The power or power and data conductors cable 12, employing a weather seal tight type power cord, may be connected quickly, resistant to the elements and rated for exterior use.

The base support section 21 is an elongated structural member that secures the entire bollard 1 assembly to a surface below. The height of the section is configured in relation to the light source modules' 17 pre-configured sub-fields of illumination 37. In other words, in calculating the light emittance over the field of illumination 36, the height of the base support section 21 is a variable that must be factored. The elongated structure can be made of metallic and/or non-metallic material. The section is made of non-corrosive material that can withstand the elements. The exterior surfaces of the section can be painted, anodized, and/or galvanized. At least one IOT device 24 can be housed inside and/or on the exterior face of the section. The base support section 21 can be fabricated by methods of extrusion, forming or molding. The base plate section 21 can define a hand hole at its bottom to allow access to the interior of the base plate section 21. The base support section 21 is secured to a ground surface by at least one attachment method, such as base plate anchor bolts 32 or an embedded cantilever.

FIGS. 1A-1D show elevations and sections of a bollard 1 embodiment.

Figure 1C:
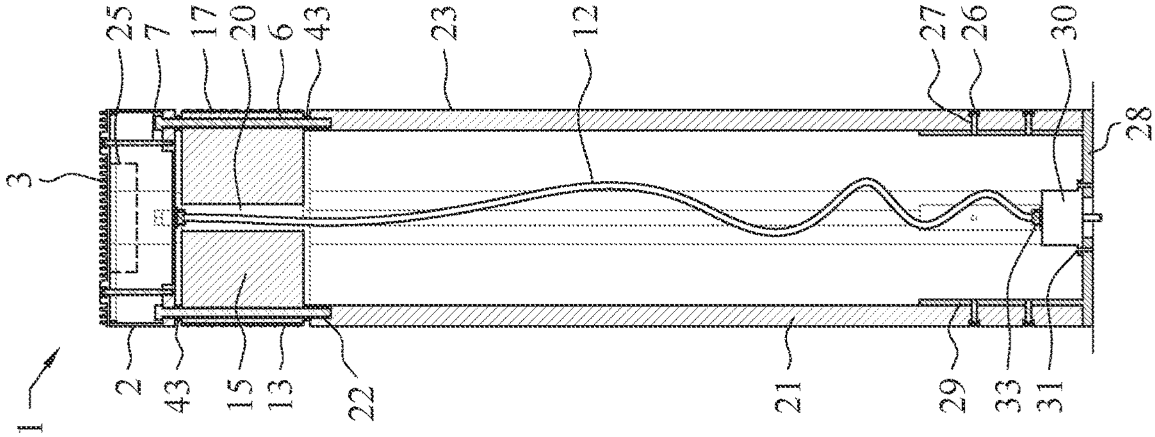
Figure 1B:
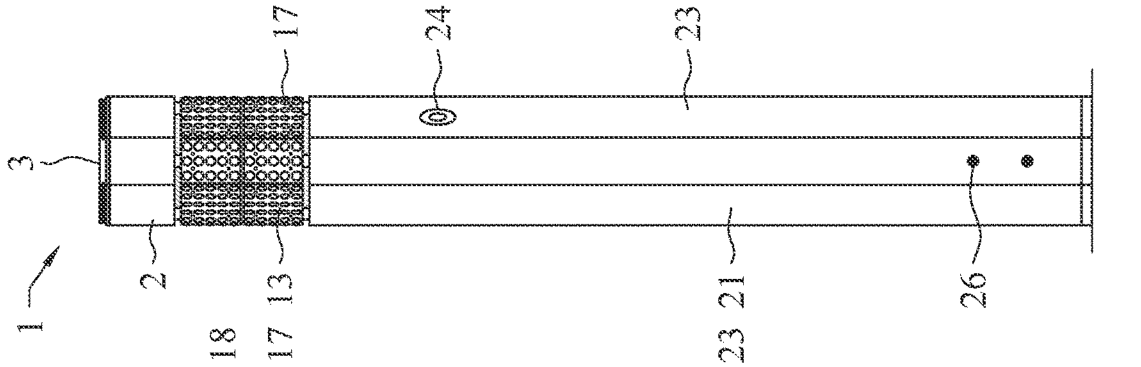
Figure 1A:
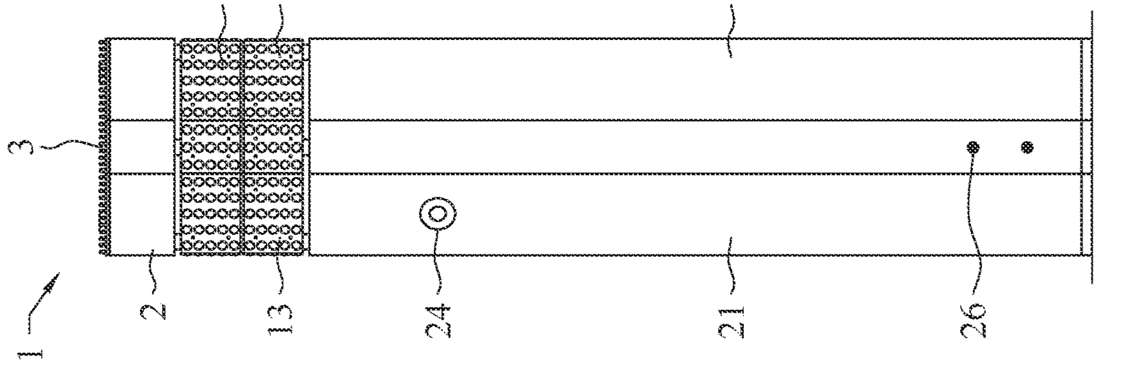

FIG. 1A shows a longitudinal elevation of the bollard 1. The bollard 1 includes the base support section 21, the heatsink section 13, and the driver housing 2. The bollard 1 is anchored to the surface below by a base plate with guiding channels (also, anchoring plate assembly) 28 coupled above ground to the base support section 21. At the bottom of the base support section 21, two base support security bolts 26 are shown, secured to the guiding channel 29. The base support section 21 profile may follow the form of the heatsink section 13 above. A profile of the driver housing 2 may correspond in form to a profile of the heatsink section 13 disposed below the driver housing 2. In this embodiment form follows function, wherein the superior light emission utility is derived in part from the preconfigured form of the heatsink section 13 profile. The heatsink section 13 exterior surfaces are shown covered by light source modules 17. The light source modules 17 include at least one substrate 41 board populated by light sources 42 having a lens 18 covering over the substrate 41. The lens 18 can employ at least one light source 42 dedicated nano-optical lens 19. In this embodiment the light source 42 is an LED lamp.

The driver housing 2 is shown above the heatsink section 13 with its driver housing cover 3 on top. The driver housing cover 3 is fabricated with a plurality of heat dissipating fins 15 shown on its exterior surface. Above and below the heatsink section 13 an air gap 43 enables hot air rising from the heatsink's 13 interior to evacuate. The air gap 43 is formed by concealed internal through bolts 6 coupled to spacer rings 4. In some examples, a screen may cover the air gaps 43, preventing insects and debris from entering an interior of the bollard 1.

FIG. 1B shows a longitudinal elevation of the bollard 1. Elements shown are the same as shown in FIG. 1A.

FIG. 1C shows a longitudinal section view of the bollard 1. The base plate with guiding channels 28, two base support securing bolts 26 coupled to the guiding channel 29 at both sides of the base support section 21, a junction box 30 coupled to the base plate 28 having the guiding channels 29. The junction box 30 is coupled to the base plate 28 having the guiding channel 29, using mechanical fasteners to engage the junction box through bores 31. The junction box 30 is shown having a junction box cover with receptacle 33.

Figures 5A, 5B, 5C, 5D, 5E, 5F:
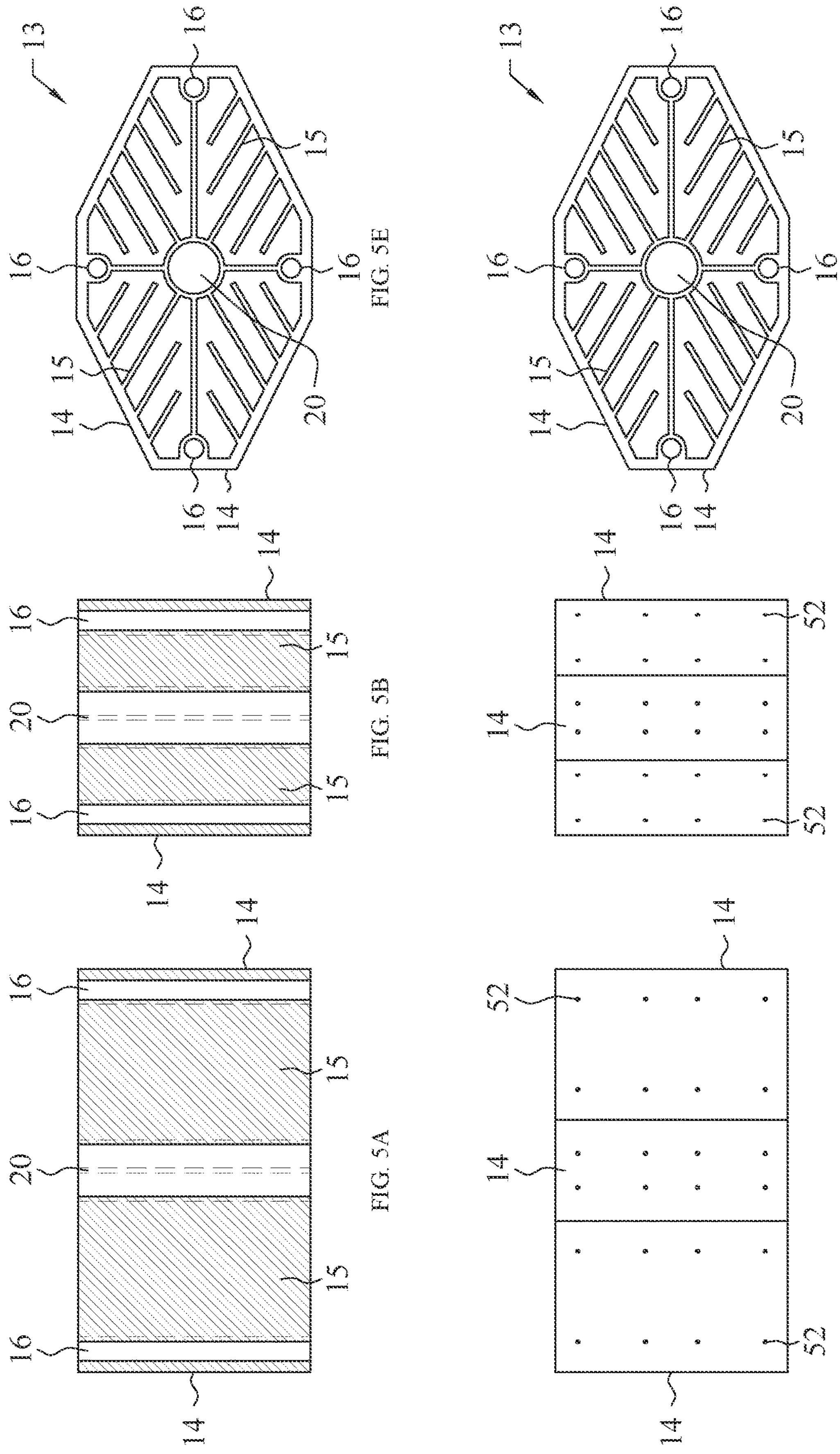
FIGS. 5A-5F show sections and elevations of the heatsink of the bollard.

At the top of the bollard's 1 embodiment, a light source driver 25 is shown in dashed line, coupled to the interior face of the driver housing cover 3, with the cover 3 having a plurality of fins 15 on its exterior face (See, e.g., FIGS. 5E and 5F). On both sides of the light source driver 25, top cover bolts 7 are shown engaging threaded bores 9 at the bottom interior of the driver housing 2. Also shown at the bottom of the driver housing 2 are through bolt bores 10 with through bolts 6 extending through the heatsink through bolt bore 16 engaging the base support threaded bore 22 below. At the bottom of the driver housing 2, a driver housing power or power and data receptacle 11 is shown coupled to the junction box cover with receptacle 33 by power or power and data conductor cable 12. In an example, power or power and data conductors may originate in the driver housing 2 and/or the base support section 21 powering light sources 42 and IOT/s 24.

FIG. 1D shows a transverse section of the bollard 1. Elements shown are the same as shown in FIG. 1C.

Figure 2A:
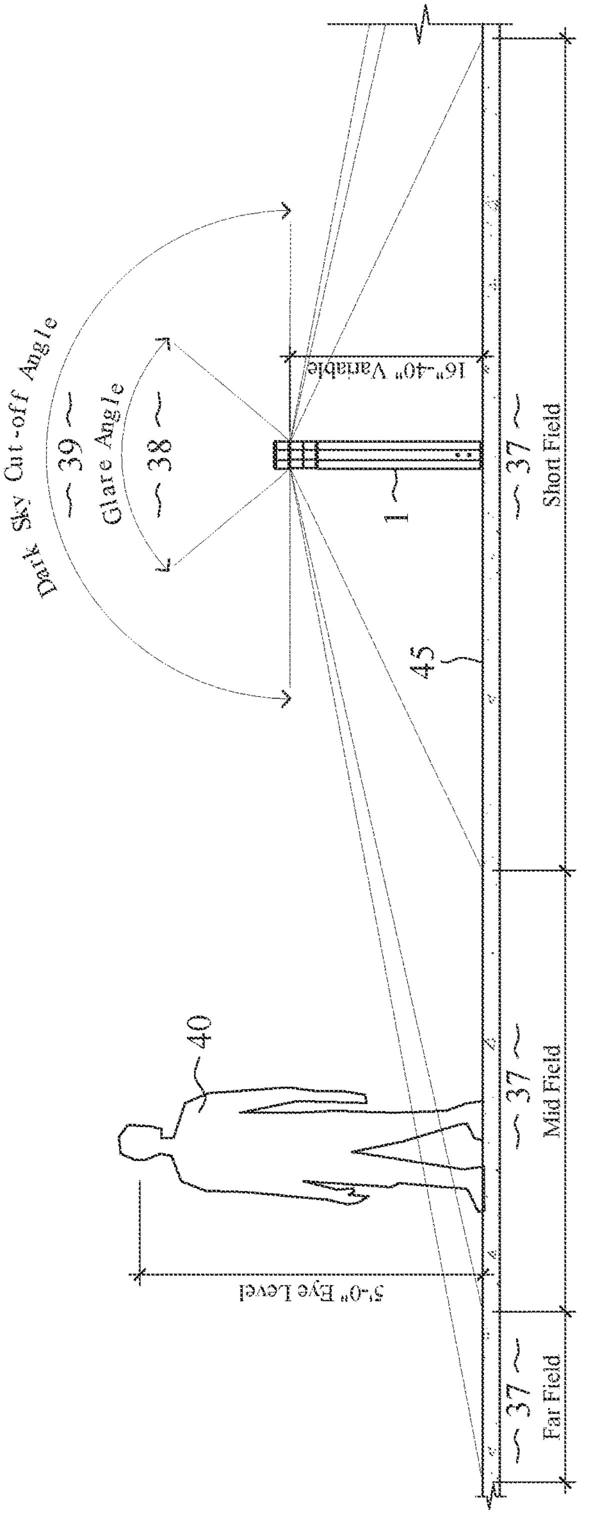
FIGS. 2A and 2B show in elevation and plan diagram of light emittance of the bollard.
Figure 2B:
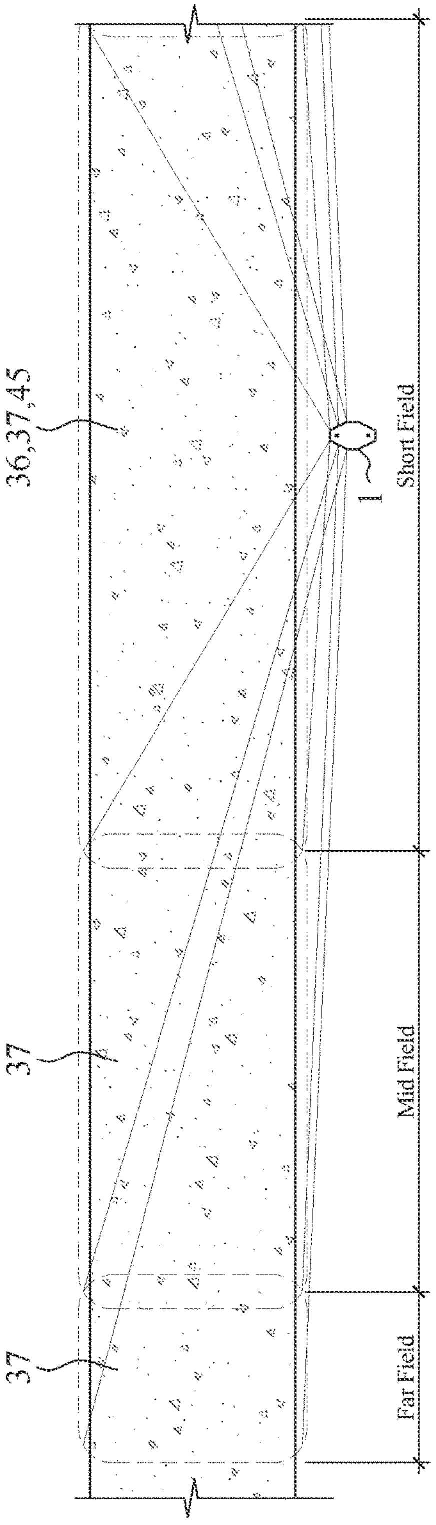

FIGS. 2A and 2B show elevation and plan diagrams of the bollard's 1 light emittance concept.

FIG. 2A shows diagrammatically an elevation of the light-emitting bollard 1 depicting a portion of the field of illumination 36 covered by the bollard's 1 light source 42. In this embodiment, the field of illumination 36 is a walkway 45 adjacent to the bollard 1. In another embodiment, the bollard 1 can be located inside a field of illumination 36. The field of illumination 36 may include sub-fields, short field, mid-field and far field. The short field is located near the bollard 1. The proximity of the field to the light source 42 necessitates a lesser quantity of lamps and/or power input to illuminate the sub-field 37. Therefore, the area retaining the light source module 17 can be smaller. In addition, this sub-field 37 can be longer than its neighboring mid-field while its farthest field can be the shortest. Since most bollards' 1 height is well below human 40 eye level, this illumination concept can eliminate or drastically reduce direct glare, e.g., as illustrated by glare angle 38, and fully meet dark sky light cut-off regulations, e.g., as illustrated by dark sky cut-off angle 39. This diagram approximates the scaled relation of the light-emitting bollard 1, a human 40, an illuminated field of illumination 36, and perceived glare and dark sky angles from the light source 42.

FIG. 2B shows diagrammatically a plan of the light-emitting bollard 1 shown in the above elevation. The bollard 1 is shown adjacent to a walkway 45 illuminating three sub-fields of illumination 37, a short field, a mid-field, and a far field. The bollard's 1 light source modules 17 are preconfigured to form an overlapping sub-field of illumination pattern that is jointed to form a contiguous uniform single field of illumination 36.

Figures 3A, 3B:
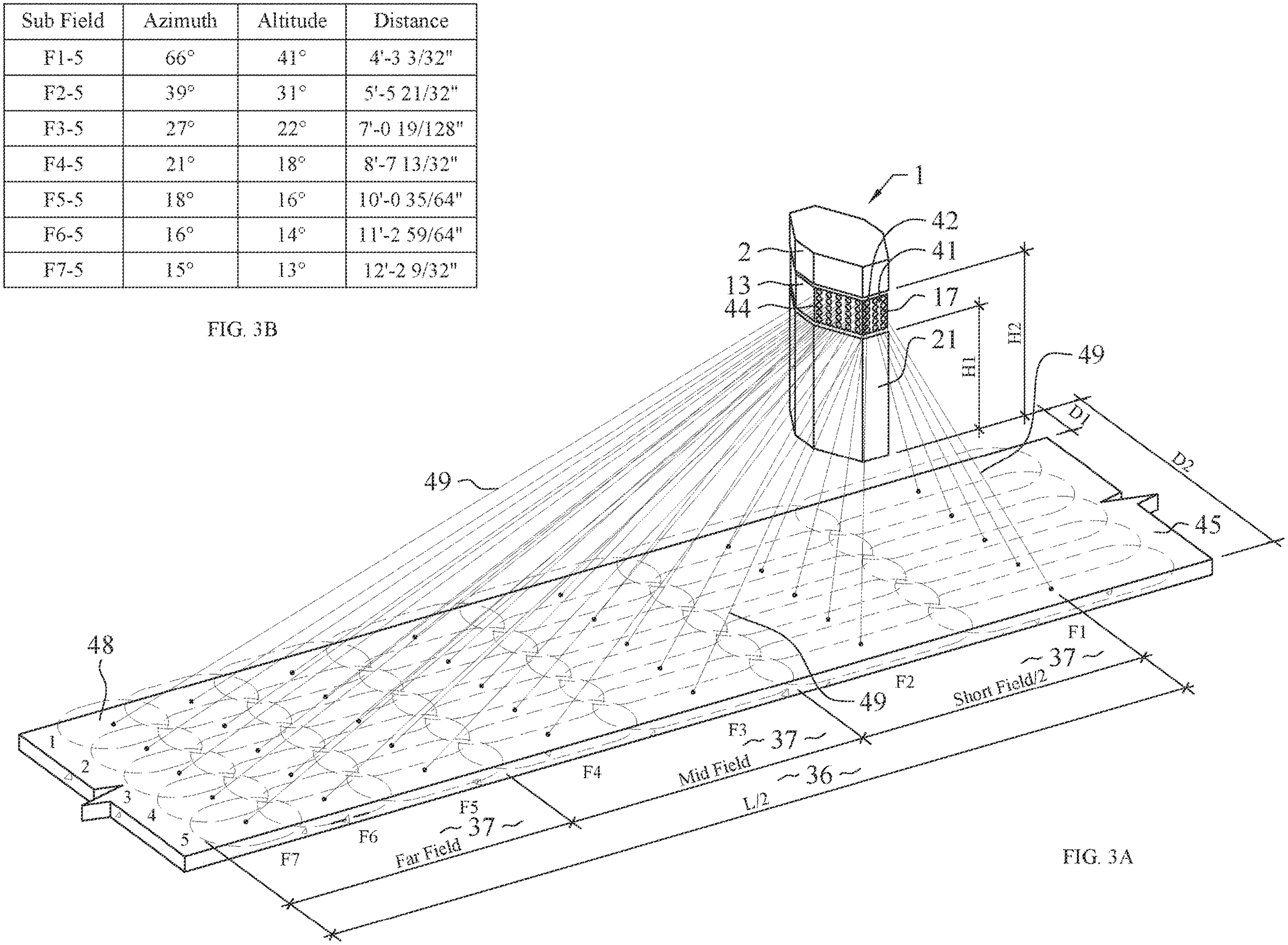
FIGS. 3A and 3B show a perspective and a table related to field of illumination light emittance of the bollard.

FIGS. 3A and 3B show a perspective of a section of a walkway illuminated by the novel bollard and a table expanding on the bollard's field of illumination light emittance concept.

FIG. 3A shows a partial section of a walkway 45 with an adjacent bollard 1 illuminating approximately half of the bollard's 1 field of illumination 36. The bollard's 1 distance from the walkway 45 is identified by the designation D1, the distance from the bollard to the remote edge is identified as D2, the length of the field of illumination 36 is identified as L (the figure shows only one-half of the field), the height of the light source module 17 above finished grade (afg) at its bottom is H1, and the height of the light source module 17 aft at its top is H2.

The bollard 1 height can vary, typically ranging between 16 and 40 inches afg. The bollard 1 can be placed alongside a walkway 45 or within an area of circulation. While FIG. 3A focuses on a bollard 1 embodiment, the novel optical light control solution can be applied to any light source retaining vertical structure illuminating at least one field of illumination 36.

FIG. 3A shows an array of lamp center beams 49 emanating from the bollard's 1 light source modules 17 directed toward specific sub-areas 48 within each sub-field of illumination 37. The lamp center beam 49 is centered about an oval-shaped area shown in dashed line representing the sub-area 48 coverage of each lamp 44. The sub-fields 37 shown include the far field, the mid-field, and one-half of the short field. This embodiment employs the same lamp 44 with a dedicated lamp nano-optical lens 19 directing each lamp center beam 49. FIG. 3A shows the far field lamp beam covering a smaller sub-area 48 than the mid-field and the short field lamp coverage area. As the distance from the light source increases, the area coverage by the light source diminishes. The lamps' area coverage overlaps to produce uniform illumination within the sub-field of illumination 37. Coupled together, the sub-fields of illumination 37 become a single unified and uniformly illuminated field 36. In another embodiment, the light source module 17 can employ at least one different lamp size, lamp form, lamp power input, lamp color temperature, lamp chromaticity, lamp color rendering index (CRI) and/or a combination thereof.

The elongated and/or wide field/s, low energy consuming and uniformly illuminating bollard is pre-configured by at least one of the following variables:

The height H1 of the light source module 17 bottom from the bollard's 1 base support section 21 mounting surface the bollard 1 is mounted to.

The height H2 of the light source module 17 top from the bollard's 1 base support section 21 mounting surface the bollard 1 is mounted to.

The horizontal transverse distance D1 between the light source module 17 base support section 21 and the nearest walkway 45 edge.

The horizontal transverse distance D2 between the light source module 17 base support section 21 and the walkway 45 far edge.

The length L of the field of illumination 36.

The distance between each sub-field of illumination 37 sub-area of illumination 48 and its corresponding light source module 17.

The orientation and tilt angle between each sub-field of illumination 37 sub-area of illumination 48 and its corresponding lamp/s 44.

The number and size of lamps 44 required to populate every light module 17.

The power input needed for each lamp 44 in the light source module 17.

The best optical lens needed to generate the most efficient light beam in the desired direction.

The orientation of the heatsink light source retaining flat surface 14 in relation to the field and sub-field of illumination 37, 36 target.

The light reflectance properties of the field of illumination 36.

The light source module 17 size and number of lamps 44 and the lamps' power input is contingent on the pre-configured area the module 17 is tasked with illuminating. FIG. 3A shows a size of the module 17 disposed parallel to the walkway 45 as being smaller than a size of the module 17 disposed perpendicular to the walkway 45. The smaller light source module 17 is tasked with illuminating the walkway 45 area in the short field. Since the distance to any sub-area 48 within the short field is relatively close, the light source module 17 can be smaller.

This innovation aims to extract optimal efficiency from the light source module's 17 plurality of lamps 44 with their respective dedicated optical lenses 19. For this reason, the light source module 17 retaining heatsink 13 profile is configured to orient or orient and tilt its heatsink light source retaining surfaces 14 in a manner that minimizes light loss due to light rays' redirection and absorption. The form of the heatsink 13 profile is configured for optimal light source emittance efficiency.

FIG. 3B shows an example of the table reflecting the distance and aiming angles of each lamp's dedicated nano-optical lens 19 illuminating a sub-area 48 within a sub-field of illumination 37. The table can be generated by a computer program. The computer program evaluates the input parameters entered and establishes at least one of: the size of the light source module 17, the location of the light source module the number of lamps 44, the size of the lamp, power input of the lamps, the spacing between the lamps, and the lamp's dedicated optic 18 including the nano-optical lens center beam target, the nano-optical lens orientation and tilt angles, and the nano-optical lens beam pattern. The program output can include fabrication plans for the light source module 17 lamp retaining substrate 41 populated with lamps 44 and/or the light source module's 17 dedicated lamp nano-optical lens 19.

Figure 4B:
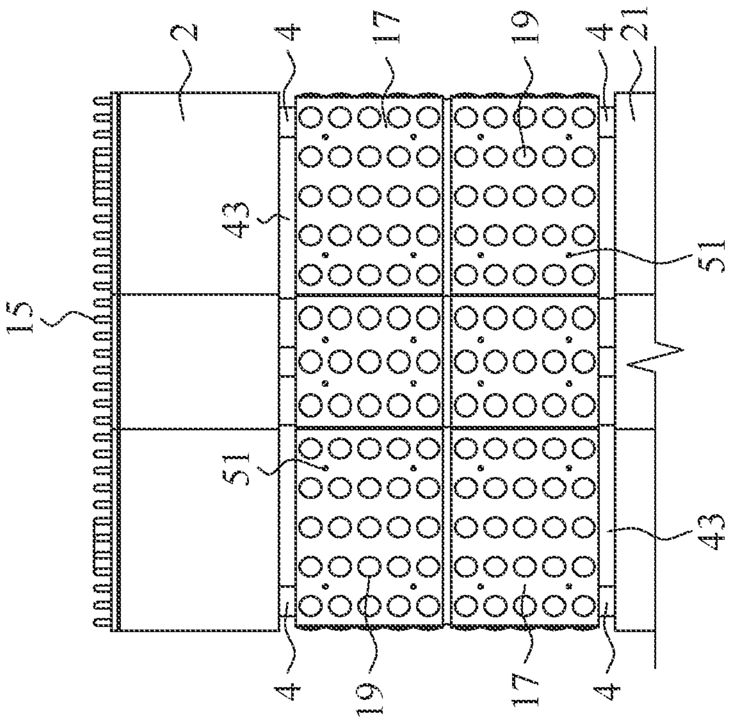
FIGS. 4A and 4B show in perspective and elevation views of the light source modules of the bollard coupled to the heatsink.
Figure 4A:
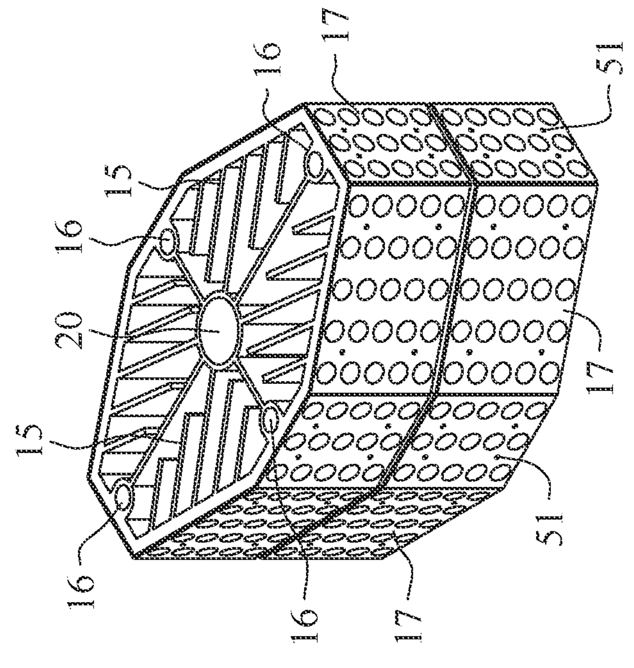

FIGS. 4A and 4B show in perspective and elevation views the bollard's 1 light source modules 17 coupled to the heatsink 13.

FIG. 4A shows in perspective view an eight-sided heatsink 13 having two tiers of light source modules 17 coupled to each of the exterior heatsink light source retaining flat surfaces 14. Over the light sources 42 is a lens 18 cover with at least one lamp 44 dedicated nano-optical lens 19. The lamp 44 dedicated nano-optical lens 19 is configured to direct the lamp's 44 central beam toward a specific target within a sub-field of illumination 37. Also shown are a plurality of mechanical fasteners, such as light source module screws 51 coupling the light source modules 17 to the heatsink light source retaining flat surface 14. There are a number of methods to couple the light source module 17 to the retaining flat surface of the heatsink 13. Using a coupling screw is an example of one method. The orientation and tilt angles of the heatsink's 13 light source 42 retaining heatsink light source retaining flat surfaces 14 are preconfigured to enable the light source to emit the light efficiently. In this embodiment the bollard's 1 heatsink light source retaining flat surfaces 14 are vertical and the orientation of three heatsink light source retaining flat surfaces 14 is preconfigured in relation to the field of illumination 36 walkway 45 it is positioned adjacent to. The top of the heatsink 13 shows a plurality of heat dissipating fins 15, heatsink through bolt bores 16, and a central channel opening 20. In this embodiment the power or the power data conductor cable 11 passes through the central channel opening 20. In another embodiment, several channels with or without beat dissipating fins 15 can induce air to rise from the bottom of the heatsink 13 to the top. This embodiment does now show power conductors' connectivity to the light source modules 17.

FIG. 4B shows an enlarged partial longitudinal elevation of the top section of the bollard 1. The heatsink section 13 is wedged between the driver housing 2 above and a portion of the base support section 21 below. An air gap 43 enables air entering from below the heatsink 13 to rise through the heatsink's 13 interior and exit through the top gap. Light source modules 17 are shown coupled to the heatsink 13 embodiment by means of mechanical fastener, such as light source module screw 51 and each of the modules is covered by at least one lens 18.

FIGS. 5A-5F show sections and elevations of the bollard's 1 heatsink 13.

FIG. 5A shows a longitudinal section through the heatsink 13. At the center, the central channel opening 20 is shown having top and bottom openings. On both sides of the central channel opening 20 heatsink through bolt bores 16 are shown. Through these bores 16 through bolts 6 couple the heatsink 13 to the driver housing 2 and the base support section 21.

FIG. 5B shows a transverse section through the heatsink 13 showing the same central channel opening 20 and two additional heatsink through bolt bores 16.

FIG. 5C shows the exterior longitudinal elevation of the heatsink 13 having threaded bores 52 enabling mechanical fasteners 51 to secure the light source modules 17 to the heatsink light source retaining flat surface/s 14.

FIG. 5D shows the exterior transverse elevation of the heatsink 13 having threaded bores 52 enabling mechanical fasteners 51 to secure the light source modules 17 to the heatsink light source retaining flat surface/s 14.

FIGS. 5E and 5F show the top and bottom elevations of the heatsink 13. The heatsink 13 elevations are the same, having four heatsink through bolt bores 16, a central channel opening 20, and a plurality of heat dissipating fins 15. The segmented eight exterior walls of the heatsink 13 orientation in this embodiment are configured to provide the light source modules 17 optimal orientation to attain the highest light delivery efficiency. The heatsink 13 material is configured to efficiently dissipate the lamp heat generated by conduction. The material can be metallic or non-metallic. The embodiment of the heatsink can be fabricated by methods of extrusion, moulding and/or any other method that can withstand the elements while keeping the light-emitting elements in good operating condition.

FIGS. 6A-6D show in plan views the bollard's driver housing and the driver housing cover.

Figure 6D:
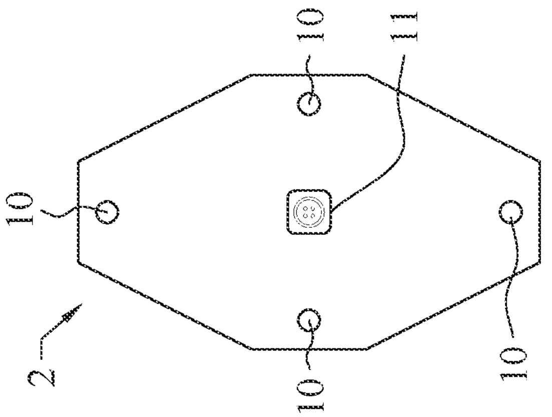
FIGS. 6A-6D show in plan views the driver housing of the bollard and the driver housing cover.
Figure 6C:
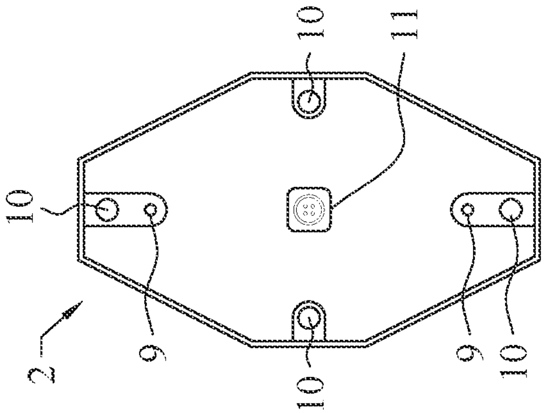
Figure 6B:
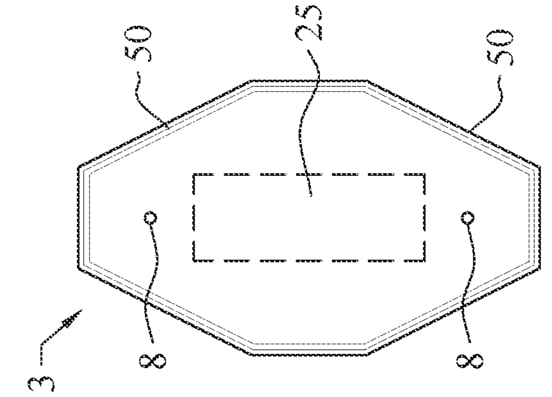
Figure 6A:
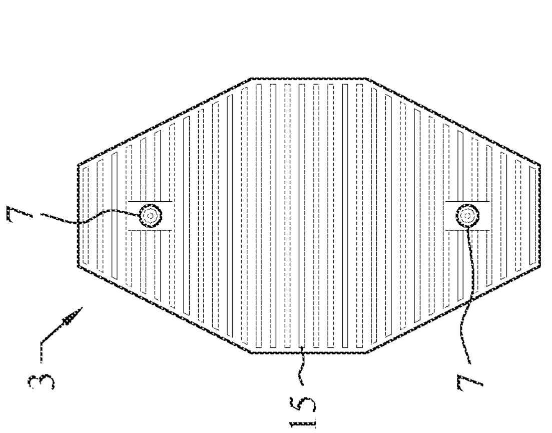

FIG. 6A shows a top view of the driver housing 2 with the driver housing cover 3 covering the housing's interior. The cover's 3 top surface shows a plurality of heat dissipating fins 15. On both sides of the cover screw heads 7 are shown securing the cover 3 to the driver housing 2.

FIG. 6B shows a view of an interior portion (or inner portion) of the driver housing cover 3 of the driver housing 2. Elements shown include top cover through bores 8 through which the top cover bolts 7 engage the driver housing 2, a mounting surface onto which the driver 25 is coupled to, and a continuous lip 50 around the perimeter of the driver housing cover 3. The exterior walls of the lip 50 are slightly smaller than the driver housing 2 inner vertical walls. To provide a moisture resistant enclosure, the driver housing cover 3 can employ an O-ring around its perimeter lip 50 and below the heads of the cover bolts 7.

FIG. 6C shows a top view of the driver housing 2. Through bolt bores 10 at four locations around the inner perimeter of the driver housing 2 enable coupling the bollard's 1 heatsink 13 and the base support section 21 to the driver housing 2. The threaded bolts 6 are inserted through the through bolt bores 10 engaging corresponding threaded bores inside the base support section 21. On two sides next to the through bolt bores 10 are the top cover bolt threaded bore bores 9. As described in reference to FIG. 1C, the top cover bolt threaded bores 9 receive a bottom portion of the top cover bolts 7. At the bottom center of the driver housing 2 a coupled receptacle 11 conveys power or power and data from the bollard's 1 base support section 21 to the driver housing 2.

FIG. 6D shows the bottom view of the driver housing 2. Driver housing through bolt bores 10 at four locations around a perimeter of the driver housing 2 retain threaded through bolts 6 that secure the heatsink 13 and the base support section 21 to the driver housing 2 from inside the driver housing 2. At the center, a power or power and data receptacle 11 is shown coupled to the driver housing 2. The receptacle 11 can receive a detachable power or power and data conductor cable 12 that on its other end is connected to an optional receptacle 33 located inside the base support section 21. The receptacles 11, 33 are configured to withstand the elements preventing moisture from entering the driver housing 2 enclosure and the junction box 30. The driver housing 2 can retain electronic devices other than the light source driver 25, and power or power and data conductors leading to and/or from the driver housing 2 can reach any device in or on the bollard's 1 embodiment. The driver housing 2, the driver housing cover 3, and any mechanical and/or electrical elements coupled thereto can be made of non-corrosive material resistant to the elements.

Figure 7C:
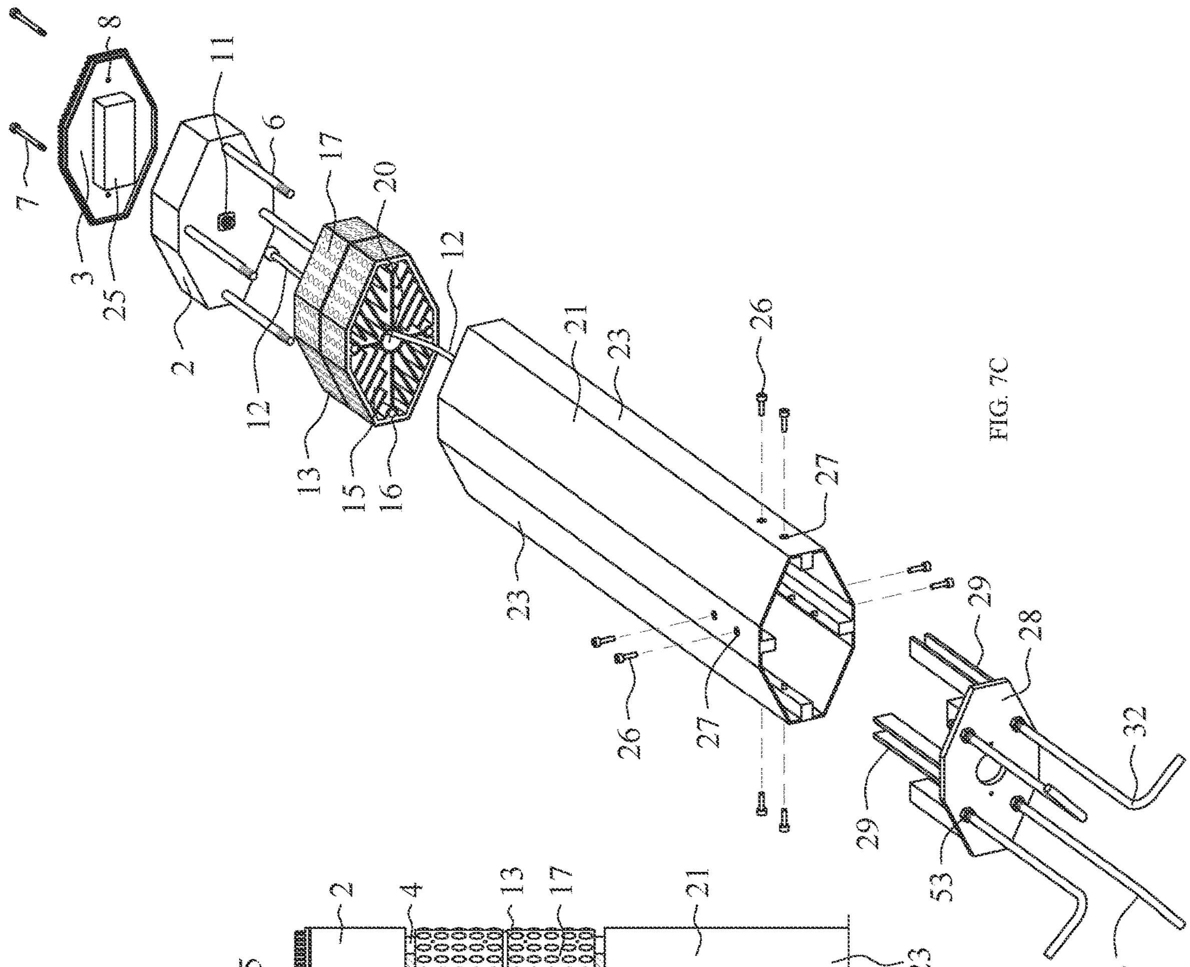
FIGS. 7A-7C show front and side partial elevations of the driver housing, heatsink and base support section, and an exploded perspective of the assembly.
Figure 7B:
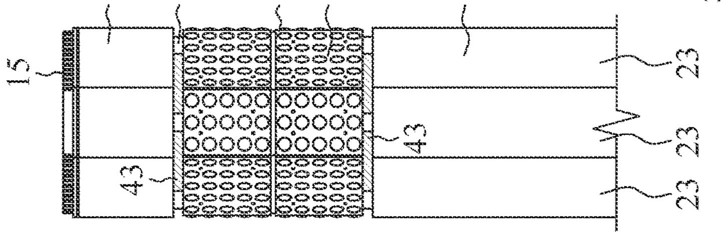
Figure 7A:
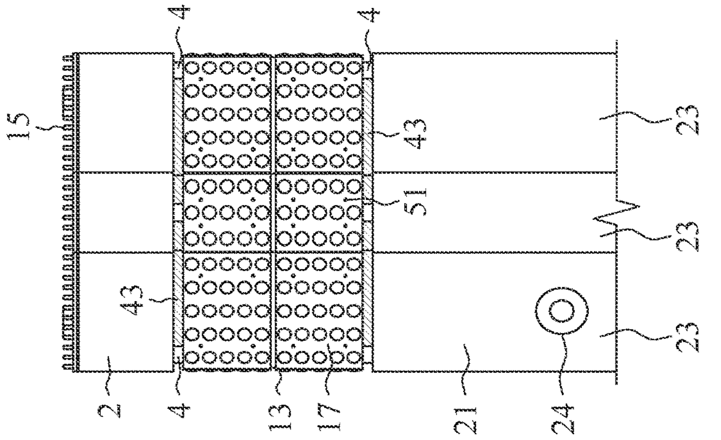

FIGS. 7A, 7B, and 7C show views front and side partial elevations of the driver housing 2, heatsink 13 and base support 21 sections, and an exploded perspective view of the light-emitting assembly of the present disclosure, respectively.

FIG. 7A shows a partial longitudinal view of the bollard 1 embodiment. The driver housing 2 is disposed at the top and the base support section 21 is disposed at the bottom. The heatsink section 13 is shown between the driver housing 2 and the base support sections 21, having spacer rings 4 separating the sections from one another. The spacer rings 4 form an air gap 43 that at the heatsink section's 13 bottom, induce air to enter the heatsink 13, and at the top, vent the heated air to the outside. In an example, the air gap 43 may employ a protective screen to prevent insects and debris from entering the interior of the bollard 1. The elements shown for the driver housing 2 include the driver housing top cover 3 and integral fins 15 on top, dissipating heat generated by the light source driver 25 and any other electronic device housed inside the driver housing 2. The elements shown on the heatsink section 13 include: light source modules 17 coupled to the heatsink light source retaining flat surfaces 14, having lenses 18 covering a plurality of lamps 44. The lens 18 can have at least one lamp dedicated nano-optical lens 19, wherein the nano-optical lens 19 covering a lamp 44 at any light source module 17 can have at least one different light beam center from another nano-optical lens 19 with a dedicated lamp 44. The light source module 17 in this embodiment is coupled to the heatsink 13 by light source module screws 51 (See, e.g., FIG. 4B). When tightened against the heatsink light source retaining flat surfaces 14, the light source module screws 51 form a uniform bond between the light source module substrate 41 and the heatsink 13. In another embodiment, other means of coupling the light source module 17 to the heatsink 13 can be used. The elements shown on the base support section 21 include an IOT device 24 and the base support section walls 23.

FIG. 7B shows a partial transverse view of the bollard 1 embodiment. The elements shown are the same as shown in FIG. 7A.

FIG. 7C shows an exploded axonometric of the bollard 1 of the present disclosure. From the top down, elements shown include: the top cover bolts 7, the top cover through bores 8, the driver housing cover 3 coupled to a driver 25, the driver housing 2, through bolts 6 extending down from the driver housing 2, a driver housing power or power and data receptacle 11 shown at the bottom center of the driver housing 2 connected to a power or power and data conductor 12 extending through the heatsink section's 13 central channel opening 20, light source modules 17 covering at least one of the light source retaining flat surfaces 14 of the heatsink 13, and a plurality of heat dissipating fins 15 at the bottom of the heatsink 13. Elements shown with the base support section 21 include: the base support threaded bores (also, base plate channel threaded bores) 27 at the bottom, base support securing bolts 26 insertable through the base support threaded bores 27 to secure the base plate 28 to the base support section 21, base plate having guiding channels 28, guiding channels 29, and base plate anchor bolts 32. As described in reference to FIGS. 7A and 7B, the spacer rings 4 and screens 5 are disposed between the heatsink 13 and the driver housing 2 and/or between the heatsink 13 and the base support section 21. In another embodiment, there can be an air gap 43 on the top of the heatsink 13 only, or no air gap 43 at all. In an example, the power or power and data assembly may enter the base plate having guiding channels 28 from below.

Figure 8B:
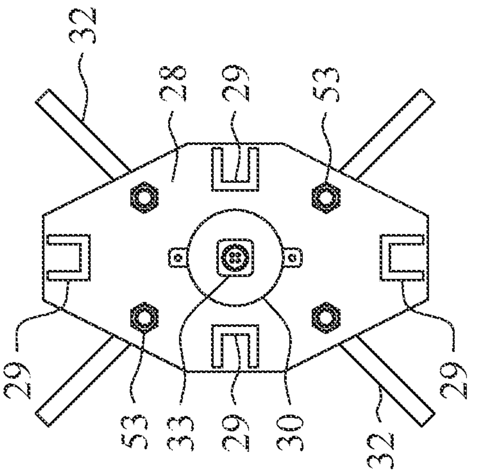
FIGS. 8A and 8B show a top perspective of the base plate with guiding channels of the bollard coupled to a partial section of the base support section and a top view of the base support section with guiding channels.
Figure 8A:
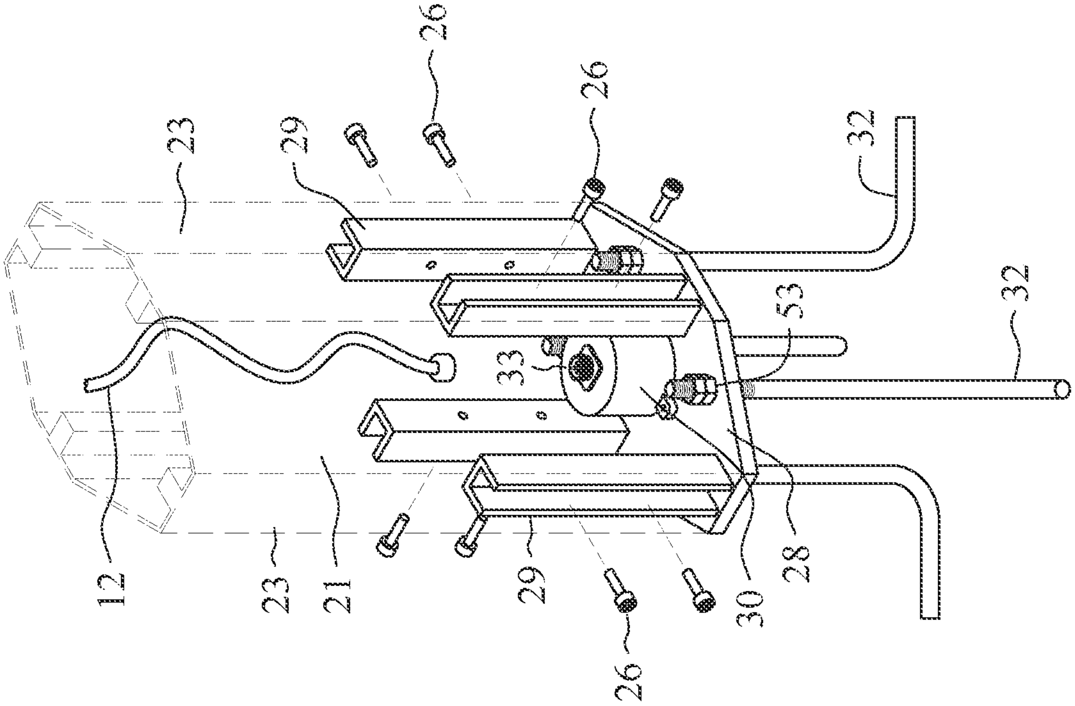

FIGS. 8A and 8B show a top perspective of the bollard's 1 base plate having guiding channels 28 coupled to a partial section of the base support section 21 and a top view of the base support section with guiding channels 28, respectively.

FIG. 8A shows a perspective of the bollard's base plate with guiding channels 28 below a partial section of the base support 21. The base support section 21 is shown in dashed line. The elements shown include: the base plate guiding channels 29 retaining the base support section 21 secured by the base support securing bolts 26, a power or power and data conductors cable 12 extended above a junction box cover with a receptacle 33, a junction box 30 coupled to a junction box base plate 31, base plate anchor bolts 32 secured to the base plate with guiding channels 28 by at least one anchor bolt nut 53 at the top and/or bottom of the plate 28. This base plate with guiding channels 28 can be formed to suit any profile of the bollard or pole assembly above. As would be understood by one skilled in the art, the power or power and data conduit/s may be coupled to the base plate with guiding channels 28 from below. Ordinarily, the entire bollard or pole assembly may be shipped from a factory complete with the base plate 28 and the base plate anchor bolts 32 set aside. Upon setting the base plate with guiding channels 28 coupled to the anchor bolts 32 in concrete, and after the concrete cures and conduit conductors or power and data is connected from below to the junction box 30, the entire bollard 1 or pole assembly can slide onto the base plate 28 guiding channels 29, first, engaging the power or power and data conductors cable 12 to the junction box cover with receptacle 33, followed by securing the base support section 21 to the guiding channels 29 with the base support securing bolts 26.

FIG. 8B shows a top view of the base plate with guiding channels 28. Elements shown include: the base plate 28, guiding channels 29, junction box 30, junction box cover with receptacle 33, base plate anchor bolts 32 and anchor bolt nuts 53.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A light emitting apparatus comprising:

at least two non-coplanar surfaces arranged substantially vertically;

at least two vertical light source arrays each coupled to one of the at least the two non-coplanar surfaces; each of the at least two vertical light source arrays including a plurality of lamps; and at least two lens arrays each coupled to one of the at least two vertical light source arrays, each of the at least two lens arrays including a plurality of nano-optical lenses corresponding to one of the plurality lamps in a corresponding one of the at least two vertical light source arrays, wherein the at least two lens arrays are each configured to direct light from the corresponding vertical light source array at least partly into a plurality of different sub-fields of illumination, which are substantially horizontal and disposed below the light emitting apparatus; wherein at least one of the plurality of lamps and corresponding nano-optical lens are configured to project light having a beam angle or illumination pattern different from that of another one of the plurality of lamps and corresponding nano-optical lens and, at least a portion of heat generated by the at least two vertical light source arrays is dissipated by convection with air flowing along a side of each of the at least two non-coplanar surfaces opposite to the at least two vertical light source arrays.

2. The light emitting apparatus of claim 1, wherein one of the at least two non-coplanar surfaces retains a plurality of the at least two vertical light source arrays.

3. The light emitting apparatus of claim 1, wherein at least two of the nano-optical lenses of one of the at least two lens arrays have center beam directions that are different from one another.

4. The light emitting apparatus of claim 1, wherein at least one IOT device is coupled with one of the at least two non-coplanar surfaces.

5. The light emitting apparatus of claim 1 wherein, at least a portion of the heat generated by at least one of the at least two vertical light source arrays transfers by conduction through the non-coplanar surface and rises through the interior of the light emitting apparatus.

6. The light emitting apparatus of claim 5, wherein heat dissipating fins are disposed on an interior surface of the at least two non-coplanar surfaces.

7. The light emitting apparatus of claim 1, wherein at least one of the at least two non-coplanar surfaces illuminates a horizontal short field of illumination directly adjacent to the light emitting apparatus.

8. The light emitting apparatus of claim 7, wherein at least one of the quantity of the plurality of lamps or power input to the plurality of lamps of one of the at least two lens arrays coupled with one of the non-coplanar surfaces is less than that of another one of the at least two lens arrays coupled with another one of the at least two non-coplanar surfaces.

9. A light emitting apparatus comprising:

at least two non-coplanar surfaces arranged substantially vertically;

at least two light source arrays, arranged vertically, and each coupled with one of the at least the two non-coplanar surfaces; each of the at least two light source arrays including a plurality of lamps; and at least two lens arrays each coupled with one of the at least two light source arrays, each of the at least two lens arrays including at least two lens-lamp combinations each comprising a plurality of nano-optical lenses, wherein the at least two lens array are configured to direct light from the corresponding light source array at least partly into a plurality of different sub-fields of illumination, which are substantially horizontal and disposed below the light emitting apparatus, wherein at least one of the lens-lamp combinations is configured to project light at least one of a beam angle or illumination pattern different from that of another lens-lamp combination, wherein a lamp of one of the lens-lamp combinations is mounted lower and is configured to illuminate an area within the sub-field of illumination that is nearer to the light emitting apparatus than another lamp of the light source array.

10. The light emitting apparatus of claim 9, wherein maintaining the same light level, the area of coverage of at least one of the nano-optical lenses diminishes the farther the area to be illuminated is located from the light source when same lamp is used.

11. The light emitting apparatus of claim 9, wherein the light patterns formed by the lens-lamp combinations of at least one light source array are at least in part configured to overlap forming a uniformly lit larger sub-field of illumination.

12. The light emitting apparatus of claim 11, wherein dedicated lenses of a lamp array module are configured to emit the light at different directions and jointly form a uniformly lit field of illumination.

13. The light emitting apparatus of claim 9, wherein at least one of the non-coplanar surfaces retaining one of the light source arrays is configured to minimize lateral optical redirection of emitted light.

14. The light emitting apparatus of claim 13, wherein the nano-optical lenses of at least one of the light source arrays coupled to a vertical surface are pre-configured to reduce apparent direct glare.

15. A light emitting apparatus comprising:

at least two non-coplanar substantially vertical surfaces;

at least two vertical light source array modules coupled to the at least the two non-coplanar substantially vertical surfaces; each of the at least two light source array modules including a plurality of lamps; and at least two lens arrays each coupled to one of the at least two light source array modules, each of the at least two lens arrays including a plurality of nano-optical lenses corresponding to each one of the plurality lamps of a corresponding light source array module, wherein the at least two lens array are each configured to direct light into a plurality of different sub-fields of illumination, which are substantially horizontal and disposed below the light emitting apparatus, wherein at least one corresponding combination of the pluralities of lamps and nano-optical lens is configured to project light at a beam angle or illumination pattern different from that of another corresponding combination of the pluralities of lamps and nano-optical lens, and an illuminated field coverage of the plurality of different sub-fields of illumination is defined according to the height and mounting location of the light emitting apparatus.

16. The light emitting apparatus of claim 15, wherein where at least two adjacent sub-fields of illumination meet, the light emitted by at least two light source modules overlap at the seam to form a uniformly lit larger field of illumination.

17. The light emitting apparatus of claim 15, wherein at least one power consuming device is disposed above one of the light source arrays.

18. The light emitting apparatus of claim 17, wherein access to the at least one power consuming device is above one of the light source arrays.

19. The light emitting apparatus of claim 15, further comprising a top cover and at least one light source driver coupled to the top cover, wherein heat generated by the light source driver is at least in part conducted to ambient through the top cover.

20. The light emitting apparatus of claim 19, wherein the top cover provides access to at least one of the at least one light source driver or an IOT device.

* * * * *